No. 811,147. PATENTED JAN. 30, 1906.
H. F. JAMES.
GEARING.
APPLICATION FILED AUG. 17, 1904.

Witnesses

Inventor
HENRY F. JAMES

By Edward R. Inman
Attorney

UNITED STATES PATENT OFFICE.

HENRY F. JAMES, OF FRANKLIN, PENNSYLVANIA.

GEARING.

No. 811,147.      Specification of Letters Patent.      Patented Jan. 30, 1906.

Application filed August 17, 1904. Serial No. 221,088.

*To all whom it may concern:*

Be it known that I, HENRY F. JAMES, a citizen of the United States, residing at Franklin, in the county of Venango and State of Pennsylvania, have invented certain new and useful Improvements in Gearing, of which the following is a specification, reference being had therein to the accompanying drawings.

My invention relates to an improved pumping power for pumping oil-wells and will be fully understood by a reference to the accompanying drawings, which form a part of this specification, and in which—

Figure 1:
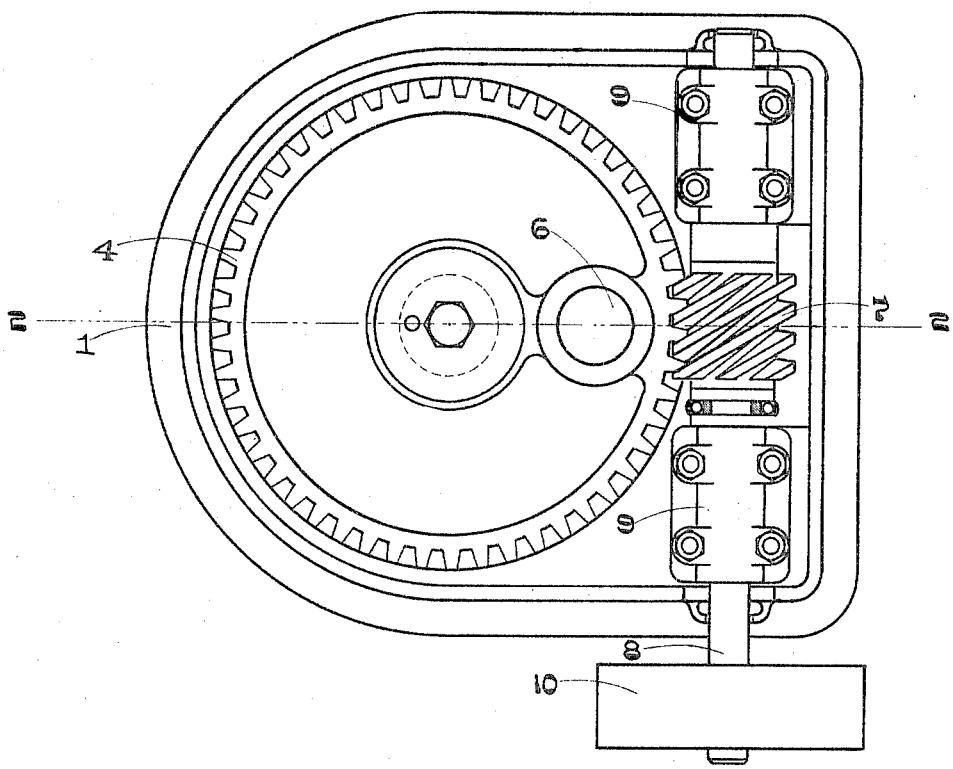
Figure 2:
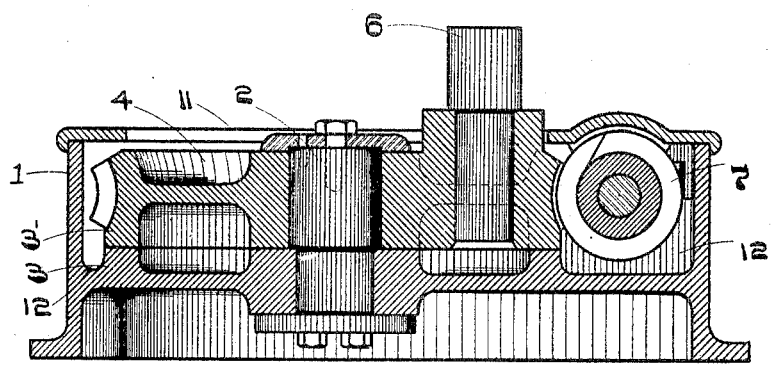

Figure 1 is a plan view of my pumping power with the top shield or cover removed. Fig. 2 is a central vertical section on line 2 2 of Fig. 1.

The same reference-letters indicate identical parts in both views.

As will be readily noted from the drawings, my device consists of a worm-wheel of peculiar construction and a worm for revolving the same, which are mounted in a bed of such construction that the same may be immersed in oil.

The construction of my device is substantially as follows:

A bed 1 of nearly semicircular plan has at the center of the circular part thereof a vertical stub-shaft 2, and upon said bed 1, concentric with the shaft 2, is formed an annular horizontal outer bearing 3. Upon the stub-shaft is mounted the crank-wheel 4, adapted to revolve horizontally. Upon the lower face of said wheel 4, near the circumference thereof, is formed the annular concentric outer bearing 3', which is coincident with the bearing 3 upon the bed, upon which it is adapted to rest. Thus wheel 4 is provided with a broad outer bearing which effectually prevents any tipping incident to a horizontal strain upon the crank-pin 6. It will be noted that the bearing 3 3' is outside the crank-pin and the circle described by its travel and is therefore admirably designed to meet the requirements and service for which it is intended.

Upon the crank-pin 6 may be mounted any of the devices commonly used for attaching surface lines to pumping powers; but the one which I consider best adapted to this purpose is the one shown and described in my application for a patent for improvements in pumping powers, filed September 12, 1903, Serial No. 174,126.

Any suitable means may be employed for revolving the crank-wheel; but said wheel is here shown as a worm-wheel, and the worm 7 is the means by which it is revolved. Worm 7 is rigidly mounted upon the shaft 8, and bearings 9 for said shaft are formed at each side of the bed. The end of the shaft 8 may be extended at either side of the bed and have mounted thereon a pulley 10 for the reception of a driving-belt.

Over the top of the bed may be placed a shield or cover 11, having a central hole therein sufficiently large to permit the crank-pin to revolve. This shield or cover is for the purpose of preventing dirt, &c., from falling into the gearing and oil-reservoirs 12 and as a safeguard against various accidents which might occur were the top of the bed left open and the contained mechanism exposed.

Having thus described my invention, what I claim as new, and desire to secure by Letters Patent, is—

In a device of the class specified, a bed, a vertical stub-shaft mounted therein, a horizontal worm-wheel, provided with a bearing upon its lower face, mounted upon said stub-shaft, a worm mounted in said bed, in mesh with said wheel, said bed being adapted to contain oil for the immersion of said wheel and worm, a shield or cover for said bed, all substantially as shown and described.

In testimony whereof I affix my signature in presence of two witnesses.

HENRY F. JAMES.

Witnesses:
     F. C. CUNDLE,
     C. E. GORDON.